(12) United States Patent
Jiang et al.

(10) Patent No.: US 11,522,617 B1
(45) Date of Patent: Dec. 6, 2022

(54) SYSTEM AND METHOD FOR PHASE NOISE COMPENSATION IN FIBERED OPTICAL PATHS

(71) Applicant: HUAWEI TECHNOLOGIES CO., LTD., Guangdong (CN)

(72) Inventors: Zhiping Jiang, Kanata (CA); Jiachuan Lin, Quebec (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/665,945

(22) Filed: Feb. 7, 2022

(51) Int. Cl.
*H04B 10/00* (2013.01)
*H04B 10/61* (2013.01)
*H04J 14/00* (2006.01)
*H04B 10/63* (2013.01)

(52) U.S. Cl.
CPC ....... *H04B 10/6165* (2013.01); *H04B 10/614* (2013.01); *H04B 10/615* (2013.01); *H04B 10/63* (2013.01)

(58) Field of Classification Search
CPC .... H04B 10/07; H04B 10/075; H04B 10/079; H04B 10/0795; H04B 10/0799
See application file for complete search history.

(56) References Cited

U.S. PATENT DOCUMENTS 9,768,874 B1 * 9/2017 Ralph ..................... H04L 27/18
2020/0322046 A1 * 10/2020 Duan ............... H04B 10/07953

* cited by examiner

Primary Examiner — Daniel G Dobson
(74) Attorney, Agent, or Firm — BCF LLP

(57) ABSTRACT

A system for laser phase noise compensation for a fibered communication path, the system being configured for connection with a node of the fibered communication path, including at least one signal splitter optically coupled to a laser source of the fibered communication path, the at least one signal splitter having two output communication path, the communication paths having a path difference therebetween; an integrated coherent receiver (ICR) optically coupled to the first output communication path and the second output communication path; and a digital signal processor (DSP) communicatively connected to the ICR, the ICR being configured to determine, based signals received from the first and second output communication paths, at least one phase noise indication related to phase noise of the laser source, the DSP being configured to determine an estimated laser phase noise based on at least the at least one phase noise indication.

17 Claims, 4 Drawing Sheets

US 11,522,617 B1

SYSTEM AND METHOD FOR PHASE NOISE COMPENSATION IN FIBERED OPTICAL PATHS

TECHNICAL FIELD

The present disclosure generally relates to the field of optical communication networks and, in particular, to systems and methods for compensating laser phase noise in optical communication paths.

BACKGROUND

Optical sensing in the fiber link is an important aspect for network management in the modern optical transmission system. One widely used sensing system is optical time-domain reflectometer (OTDR). By detecting the physical quantities (such as power) of backward reflected light at different time interval, one can get the link information at different location. Coherent phase-OTDR can further be implemented to acquire additional information from the backward reflected light, also referred to as a signal under test.

One of the key requirements of coherent phase-OTDR systems is a narrow linewidth laser (for example, sub-kHz). The cost of an ultra-narrow linewidth laser (several kilo hertz) is tens of times higher than a laser with 100 kHz, which could otherwise be sufficient for the network management requirements.

Some systems for avoiding the linewidth requirement have been proposed. For example, on-chip active phase lock loop (OPLL) systems have been proposed. In such a solution, however, several elements of additional hardware are required, adding additional cost to the overall network. The additional control chip also needs to be co-packaged with the laser chip, further increasing costs.

To this end, there remains an interest in being able to reduce the linewidth requirement of a laser source of coherent phase-OTDR systems for backward reflected signal analysis in optical networks.

SUMMARY

By way of introduction, an object of the present disclosure (that is, one general purpose of this disclosure) is to reduce the requirement of laser linewidth for a coherent phase-OTDR system, by providing a system that estimates and compensates laser phase noise of the corresponding laser source. It is proposed to take advantage of mature integrated coherent receiver (ICR) design, and ASIC design. In the proposed design, by adding a SP-ICR or sharing the same ICR, laser phase noise is detected coherently, and then used to compensate the received back-reflected signal in the digital domain. The linewidth requirement is thus reduced, and the cost of implementing the present technology is generally low. While the present technology is presented herein as applied to use in optical communication networks, it is noted that at least some aspects could be applied to or implemented in other sensing, non-communication scenarios such as petroleum pipeline monitoring using fiber optics and reflected signals.

According to at least some aspects of the invention, there is provided a system for laser phase noise compensation for a fibered optical path. The system is configured for connection with a node of the fibered optical path, the system including at least one signal splitter optically coupled to a laser source of the fibered optical path, the at least one signal splitter having: a first output optical path, and a second output optical path, the first and second output optical paths having a path difference therebetween; an integrated coherent receiver (ICR) optically coupled to the first output optical path and the second output optical path; and a digital signal processor (DSP) communicatively connected to the ICR, the ICR being configured to determine, based on signals received from the first output optical path and the second output optical path, at least one phase noise indication related to phase noise of the laser source, the DSP being configured to determine an estimated laser phase noise of the laser source based on at least the at least one phase noise indication.

In some embodiments, the DSP is further configured to compensate a detected reflected signal from the fibered optical path, based on the estimated laser phase noise.

In some embodiments, the at least one phase noise indication includes a first indication and a second indication; and the DSP is configured to determine the estimated laser phase noise of the laser source based on both the first indication and the second indication.

In some embodiments, the ICR is further configured to determine an interference relation between signals received from the first output optical path and the second output optical path; the first indication is proportional to a real part of the interference relation; and the second indication is proportional to an imaginary part of the interference relation.

In some embodiments, the system further includes at least one analog-to-digital converter (ADC) communicatively connected to the ICR.

In some embodiments, the at least one ADC includes at least a first ADC and a second ADC.

According to another aspect of the invention, there is provided a system for laser phase noise compensation for a fibered optical path, the system being configured for connection with a node of the fibered optical path. The system includes a first signal splitter optically coupled to a laser source of the fibered optical path, the first signal splitter having a first output optical path communicatively connected to an integrated coherent receiver (ICR) of the node, and a second output optical path; a second signal splitter optically coupled to the second output optical path, the second signal splitter having a third output optical path, and a fourth output optical path, the third and fourth output optical paths having a path difference therebetween; a single polarization integrated coherent receiver (SP-ICR) optically coupled to the third output optical path and the fourth output optical path; and a digital signal processor (DSP) communicatively connected to the SP-ICR and the ICR, the SP-ICR being configured to determine, based on the path difference, at least one phase noise indication related to phase noise of the laser source, the DSP being configured to determine an estimated laser phase noise of the laser source based on at least the at least one phase noise indication.

In some embodiments, the DSP is further configured to compensate a detected reflected signal from the fibered optical path, based on the estimated laser phase noise.

In some embodiments, the at least one phase noise indication includes a first indication and a second indication; and the DSP is configured to determine the estimated laser phase noise of the laser source based on both the first indication and the second indication.

In some embodiments, the SP-ICR is further configured to determine an interference relation between signals received from the third output optical path and the fourth output optical path; the first indication is proportional to a real part of the interference relation; and the second indication is proportional to an imaginary part of the interference relation.

In some embodiments, the system further includes at least one analog-to-digital converter (ADC) communicatively connected to the SP-ICR.

In some embodiments, the at least one ADC includes a first ADC and a second ADC.

According to another aspect of the invention, there is provided a method for compensating laser phase noise for a fibered optical path connected to a node, the method being performed by a system communicatively connected to the fibered optical path. The method includes detecting, by an integrated coherent receiver (ICR), a first signal from a laser source of the node and a second signal from the laser source, the second signal having a delay from the first signal; determining, by the ICR, based on the delay between the second signal and the first signal, at least one phase noise indication related to phase noise of the laser source, determining, by a digital signal processor (DSP), an estimated laser phase noise of the laser source based on at least the at least one phase noise indication.

In some embodiments, the method further includes compensating, by the DSP, based on the estimated laser phase noise, a detected reflected signal from the fibered optical path.

In some embodiments, determining the at least one phase noise indication includes determining a first indication, and determining a second indication; and determining the estimated laser phase noise is based on both the first indication and the second indication.

In some embodiments, determining the first indication includes determining I(t), where:

$$I(t) \propto Re\{A(t-\tau)A^*(t)\}$$

determining a second indication includes determining Q(t), where:

$$Q(t) \propto Im\{A(t-\tau)A^*(t)\}; \text{ and}$$

determining the estimated laser phase noise includes determining $\Delta\varphi(k)$, where:

$$\Delta\hat{\varphi}_\tau(k) = \text{angle}(I(k)+jQ(k)),$$

with A(x) being an electric field from the laser source, $\tau$ being the delay between the first signal and the second signal.

In some embodiments, the method further includes, prior to determining the estimated laser phase noise, converting, by at least one analog-to-digital converter (ADC), an analog output of the first signal and the second signal from the ICR into a digital output of the first signal and the second signal.

BRIEF DESCRIPTION OF THE DRAWINGS

The features and advantages of the present disclosure will become apparent from the following detailed description, taken in combination with the appended drawings, in which.

Figure 1:
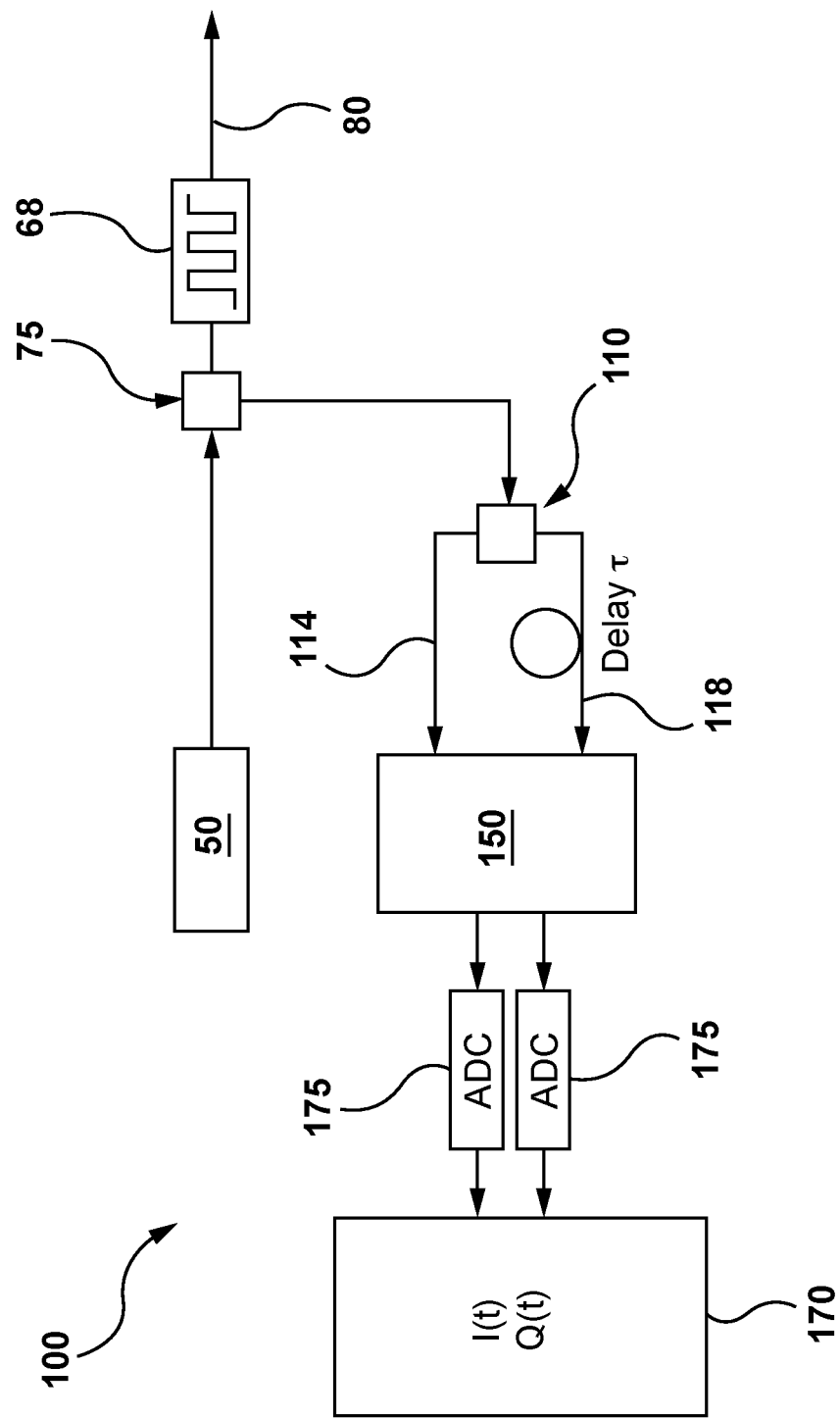
FIG. 1 depicts a conceptual diagram of system for compensating laser phase noise according to the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the described technology will be described more fully hereinafter with reference to the accompanying drawings, in which representative embodiments are shown. The present technology concept may, however, be embodied in many different forms and should not be construed as limited to the representative embodiments set forth herein. Rather, these representative embodiments are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "controller", "processor" or "processing unit", may be provided through the use of dedicated hardware as well as hardware capable of executing software in association with appropriate software and according to the methods described herein. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown, the hardware being adapted to (made to, designed to, or configured to) execute the modules. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present disclosure.

With reference to FIG. 1, there is illustrated a conceptual diagram of a system 100 according to a non-limiting embodiment of the present technology. The system 100 is generally a coherent homodyne detection and digital reconstruction system for compensating for laser phase noise, as will be described in further detail below. As is further illustrated in FIG. 2, the system 100 is configured for connection within a node 90 optically and communicatively connected to a fibered communication path 80 of an optical communication network (not shown). Depending on the specific implementation, the node 90 itself could be operatively connected to any number of communication paths, specifically optical fibers, for treating a plurality of optical communication paths of the optical communication network. It is also contemplated that the system 100 could be connected to, but not included in, the node 90.

In the arrangement within the node 90, there is included an optical coupler 75. The optical coupler 75 receives light from the laser source 50 and splits the light into two paths. One path is optically and communicatively connected to the communication path 80, through which a first portion of the light from the laser source 50. A second path from the optical coupler 75 directs a second portion of the light from the laser source 50 toward the system 100. The node 90 further includes a signal modulator 68 for modulating the portion of light exiting the mode 90 into the communication path 80. The coupler 75 is disposed prior to the modulator 68, such that the continuous wave light from the laser source 50 is sent to the system 100 for investigation (described further below).

In the illustrated embodiment, the node 90 includes an integrated coherent receiver (ICR) 60, optically connected to the laser source 50 via the coupler 75, as well as an optical circulator 78. The circulator 78 directs light received from the laser source 50 out to the communication path 80, and directs light reflected back from the path 80 (i.e. the signal under test) to the ICR 60 for analysis by the ICR 60 and the DSP 170. The node 90 further includes amplifiers 95, specifically erbium-doped fiber amplifiers (EDFA) 95, although the exact type and number of amplifiers 95 could vary in different embodiments. The node 90 further includes a series of analog-to-digital converters (ADCs) 65 communicatively connecting the ICR 60 to the DSP 170. The node 90 further includes an additional signal splitter 85, optically connected to the signal splitter 75, for providing a reference signal (i.e. a local oscillator) from the laser source 50 to the ICR 60.

Figure 2:
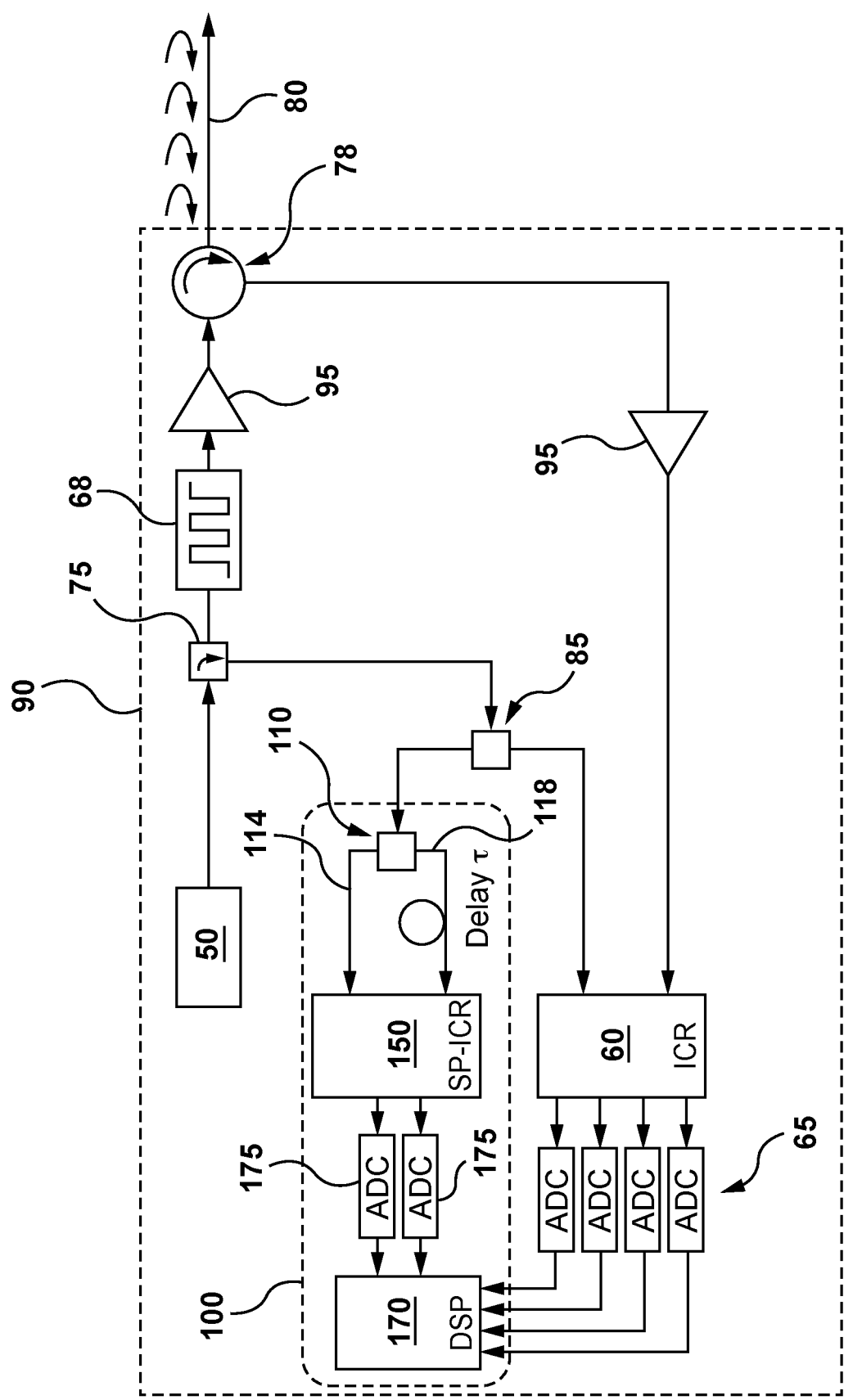
FIG. 2 depicts a conceptual diagram of a node for an optical network with the system for compensating laser phase noise of FIG. 1.

With continued reference to FIGS. 1 and 2, the system 100 according to the present technology will be described in more detail. The system 100 includes a signal splitter 110 optically coupled to a laser source 50 of the fibered communication path. In the illustrated embodiment, the splitter 110 is optically connected to the laser source 50 via the optical coupler 75. While the specific implementation could vary, the signal splitter 110 is generally an optical fiber coupler. The signal splitter 110 has two communication paths, specifically a first output communication path 114 and a second output communication path 118.

As is illustrated by the additional loop, the first and second output communication paths 114, 118 have a path difference therebetween. In the illustrated version, the communication path 118 is longer than the communication path 114 by an optical delay of τ, although it is contemplated that the path lengths of the paths 114, 118 could be reversed in some embodiments. The exact difference in optical path length between communication paths 114, 118 (more specifically the difference in length of the optical fibers forming the paths 114, 118) will depend on the specific fiber materials and wavelength of the particular embodiment.

The system 100 also includes an integrated coherent receiver 150 optically coupled to both the output communication paths 114, 118. In the embodiment of FIGS. 1 and 2, the ICR 150 is specifically a single polarization integrated coherent receiver (SP-ICR) 150.

The system 100 further includes a digital signal processor (DSP) 170 communicatively connected to the SP-ICR 150. It is contemplated that an additional digital signal processor could be included in the node 90 to receive, inspect, and/or treat signals under test. While presented as separate entities for simplicity, the SP-ICR 150, the DSP 170, and the ICR 60 could be implemented into one or multiple chips, depending on the embodiment.

The system 100 further includes at least one analog-to-digital converter (ADC) 175 communicatively connecting to the SP-ICR 150 to the DSP 170. In the embodiment of FIGS. 1 and 2, the system 100 specifically has two ADCs 175 which treat two output signals from the SP-ICR 150. It is also contemplated that one ADC 175 having two channels could be utilized in some embodiments.

Operation of the system 100 will now be broadly described. The SP-ICR 150 is configured to determine, based signals received from the output communication paths 114, 118, at least one phase noise indication related to phase noise of the laser source 50. The DSP 170 is configured to subsequently determine an estimated laser phase noise of the laser source 50, based on at least the at least one phase noise indication from the SP-ICR 150. In at least some embodiments, the DSP 170 is further configured to compensate a detected reflected signal from the fibered optical communication path 80, based on the estimated laser phase noise.

According to the present technology, the at least one phase noise indication determined by the SP-ICR 150 includes a first indication and a second indication upon which the DSP determines the estimated laser phase noise of the laser source 50. More specifically, the first indication is proportional to a real part of an interference relation between the electric fields detected in the two output communication paths 114, 118 and the second indication is proportional to an imaginary part of the interference relation. To expand upon this relation, the electrical field of the continuous wave laser source 50 can be mathematically described as:

$$A(t) = \sqrt{P_0} \, e^{j(\omega_0 t + \varphi_n(t))}, \quad \text{Eq. (1)}$$

where $P_0$ is the power of laser source 50, $\omega_0$ is the center frequency of the laser source 50, $\varphi_n(t)$ is the laser phase noise, and t is time. The phase noise term generally follows a wiener process model, i.e. for a time interval of $\tau$, the differential phase "$\varphi_\tau(t) = \varphi_n(t-\tau) - \varphi_n(t)$ is a random variable, whose mean value is 0 and has a variance is $2\pi \cdot \tau \Delta v$, where $\Delta v$ is the linewidth of the laser source 50.

Once split by the coupler 110, the portion of the light arriving at the SP-ICR 150 via the path 114 can be mathematically described by $(1-\alpha) \cdot A(t)$, where $\alpha$ is the splitting ratio of the signal splitter 110. The light arriving at the SP-ICR 150 via the path 118 is delayed by $\tau$, is denoted as the delayed electrical field of $\alpha \cdot A(t-\tau)$.

After treatment of the interfered electrical field in the SP-ICR 150, the outputs of the SP-ICR 150 are thus:

$$I(t) \propto Re\{A(t-\tau)\} = \alpha(1-\alpha)P_0 \cos(\omega_0 \tau + \Delta\varphi_\tau(t)) + n_i(t), \text{and} \quad \text{Eq. (2)}$$

$$Q(t) \propto Im\{A(t-\tau)\} = \alpha(1-\alpha)P_0 \sin(\psi_0 \tau + \Delta\varphi_\tau(t)) + n_q(t) \quad \text{Eq. (3)}$$

where $n_i(t)$ and $n_q(t)$ are the noise term in I and Q outputs. Through analog to digital conversion sampling by the ADCs 175, the time domain signal is converted into digital domain as discrete samples, i.e. I(k) and Q(k), where k denotes the discrete time index of the sampled sequence.

From the ADCs 175, the DSP 170 receives the digitized versions of I(k) and Q(k), from which a differential phase term $\varphi\hat{\varphi}_\tau(k)$ can be generally determined. The differential phase noise term can be estimated by:

$$\Delta\hat{\varphi}_\tau(k) = \text{angle}(I(k) + jQ(k)). \quad \text{Eq. (4)}$$

To further estimate the phase noise $\hat{\varphi}_n(k)$, the DSP 170, in at least some embodiments, can be configured to estimate the phase noise using the relation:

$$\hat{\varphi}_n(k+1) + \vec{C} = \hat{\varphi}_n(k) + \Delta\hat{\varphi}_\tau(k-T) + \Delta\hat{\varphi}_\tau(k), \quad \text{Eq. (5)}$$

where $\vec{C}$ is a constant phase vector (related to the delay $\tau$). It is noted that the constant phase factor cannot be measured directly and may be adjusted in a calibration phase. Different choices for the constant phase term will be could affect accuracy of phase estimation.

Figure 3:
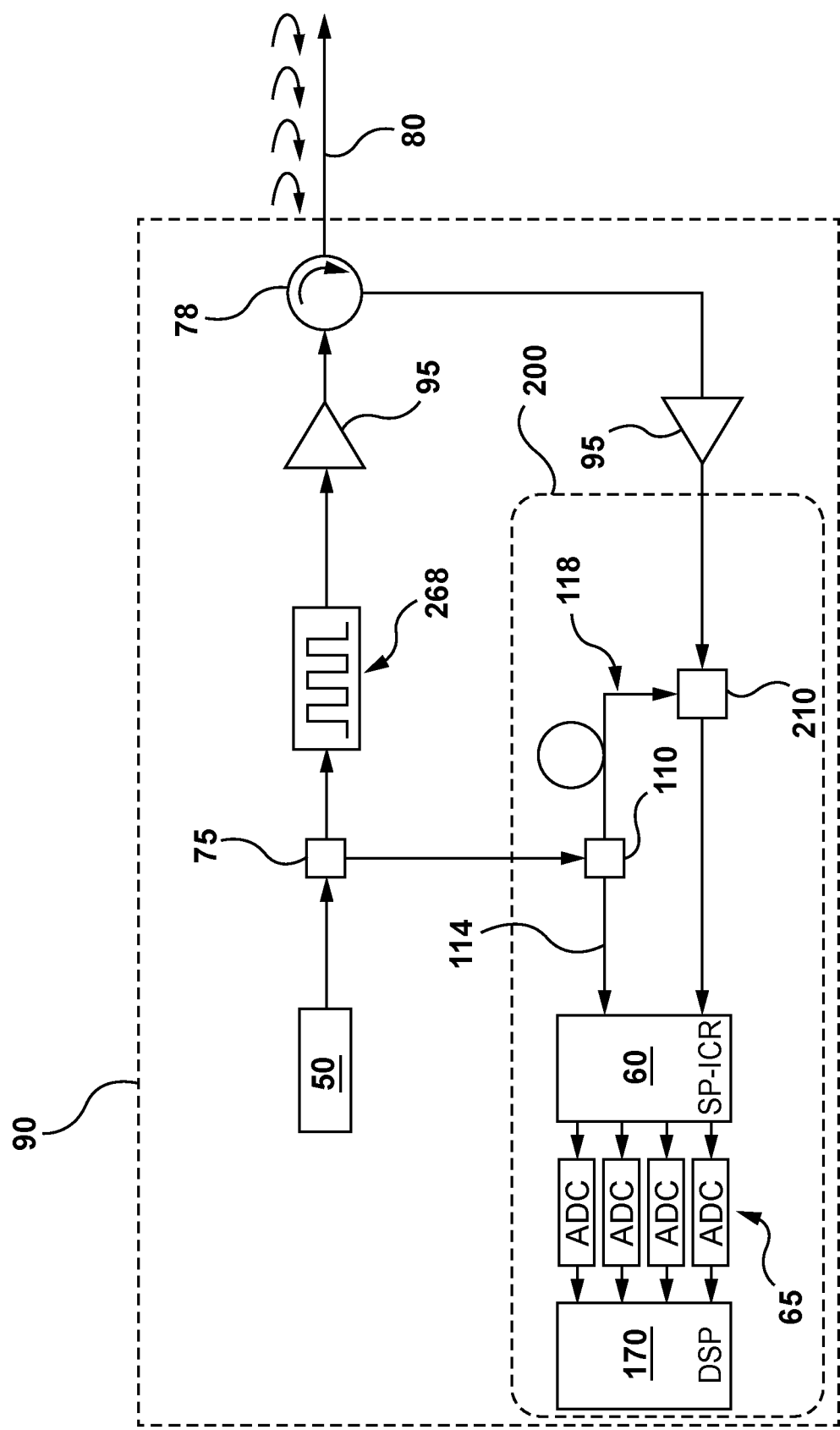
FIG. 3 depicts a conceptual diagram of a node for an optical network with another system for compensating laser phase noise according to the present technology.

With reference to FIG. 3, there is illustrated another non-limiting embodiment of a phase noise compensation system 200 for a fibered communication path. Elements of the phase noise compensation system 200 that are similar to those of the phase noise compensation system 100 retain the same reference numeral and will generally not be described again.

In place of including the SP-ICR, as is the case for the system 100, the system 200 utilizes the ICR 60 of the node 90 to perform analysis of the laser phase noise, as outlined above. In this embodiment, the system 200 includes a frequency shift in the pulse generation in order to avoid the overlap between the local oscillator and the back reflected signal (the signal under test). Specifically, the node 90 includes a modulator 268 for modulating and frequency shifting the output light. The modulator 268 is again disposed after the coupler 75 for modulating and frequency shifting the light going to the output path 80, but not to the system 200.

The coupler 110 again receives light from the laser source 50, via the splitter 75, with light passing through two output paths 114, 118. In the system 200, the output communication path 118 (having the delay $\tau$) is connected to an optical coupler 210. The coupler 210 receives the back reflected light from the communication path 80 (i.e. the signal under test) from the circulator 78. The output communication path 114 thus provides the local oscillator reference to the ICR 60, while the coupler 210 sends a combination of the signal under test and the delayed local oscillator (from communication path 118) in parallel to the ICR 60. In the embodiment of system 200, the DSP 170 further includes a low-pass filter to separate the local oscillator and the signal under test.

Figure 4:
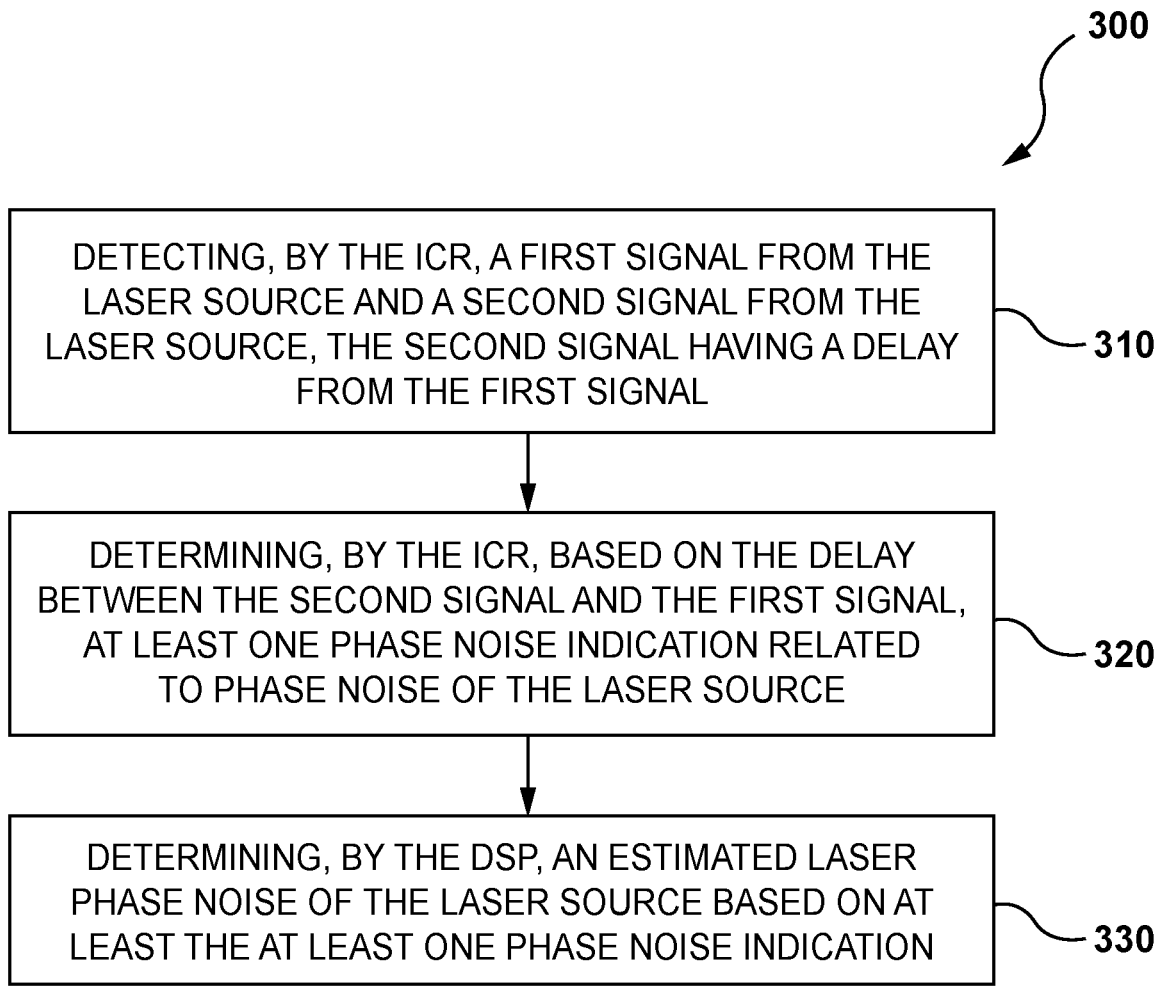
FIG. 4 depicts a flowchart illustrating an embodiment of a method for operating the phase compensation system of FIG. 1.

With reference to FIG. 4, a method 300 for compensating laser phase noise in a fibered communication path is illustrated. The method 300 is described below as performed by the ICR 150 and the DSP 170 of the system 100, but in at least some implementations it is contemplated that the method 300 could be performed using another embodiment, such as the system 200. It is also contemplated that additional controllers could be included in the systems 200 or 300 for managing the method 300 in some embodiments.

The method 300 begins, at step 310, with detecting, by the SP-ICR 150, a first signal from the laser source 50 and a second signal from the laser source 50. Specifically, the SP-ICR 150 detects signals received from the communication paths 114, 118, where the second signal has a delay from the first signal due to the path difference between the communication paths 114, 118.

The method 300 continues, at step 320, with determining, by the ICR 150, based on the delay between the second signal and the first signal, at least one phase noise indication related to phase noise of the laser source 50. As is mentioned above, in the present embodiment the at least one phase noise indication includes real and imaginary portions of the two signals interfered together.

The method 300 then continues, at step 330, with determining, by the DSP 170, an estimated laser phase noise of the laser source based on the phase noise indications.

In at least some embodiments, the method 300 further includes compensating, at least in part by the DSP 170, based on the estimated laser phase noise, a detected reflected signal from the fibered optical communication path 80. In this way, noise can be reduced, permitting phase measurements of reflected signals to be used while reducing the linewidth requirement for the laser source 50 of the network.

In some embodiments of the method 300, determining the at least one phase noise indication includes determining a first indication and determining a second indication. The method 300 could then further include determining the estimated laser phase noise is based on both the first indication and the second indication.

In at least some such embodiments of the method 300, determining the first indication includes determining I(t), where:

$$I(t) \propto Re\{A(t-\tau)A^*(t)\}; \text{and} \quad \text{Eq. (6)}$$

determining a second indication includes determining Q(t), where:

$$Q(t) \propto Im\{A(t-\tau)A^*(t)\} \quad \text{Eq. (7)}$$

In such a case, determining the estimated laser phase noise then includes determining $\Delta\varphi(k)$, where:

$$\Delta\hat{\varphi}_\tau(k) = \text{angle } (I(k)+jQ(k)). \quad \text{Eq. (8)}$$

As is mentioned above, A(x) is an electric field from the laser source 50 and τ is the delay between the first signal and the second signal received from the communication paths 114, 118 at the SP-ICR 150.

In at least some embodiments, the method 300 further includes, prior to determining the estimated laser phase noise, converting, by one or more of the ADCs 175, an analog output of the first signal and the second signal from the ICR into a digital output of the mixing results of the first signal and the second signal. The DSP 170 then receives digitized versions of the mixed first and second signals from the channels 114, 118.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

The invention claimed is:

1. A system for laser phase noise compensation for a fibered optical path, the system being configured for connection with a node of the fibered optical path, the system comprising:
   at least one signal splitter optically coupled to a laser source of the fibered optical path, the at least one signal splitter having:
      a first output optical path, and
      a second output optical path,
         the first and second output optical paths having a path difference therebetween;
   an integrated coherent receiver (ICR) optically coupled to the first output optical path and the second output optical path; and
   a digital signal processor (DSP) communicatively connected to the ICR,
   the ICR being configured to determine, based on signals received from the first output optical path and the second output optical path, at least one phase noise indication related to phase noise of the laser source,
   the DSP being configured to determine an estimated laser phase noise of the laser source based on at least the at least one phase noise indication.

2. The system of claim 1, wherein the DSP is further configured to compensate a detected reflected signal from the fibered optical path, based on the estimated laser phase noise.

3. The system of claim 1, wherein:
   the at least one phase noise indication includes a first indication and a second indication; and
   the DSP is configured to determine the estimated laser phase noise of the laser source based on both the first indication and the second indication.

4. The system of claim 3, wherein:
   the ICR is further configured to determine an interference relation between signals received from the first output optical path and the second output optical path;
   the first indication is proportional to a real part of the interference relation; and
   the second indication is proportional to an imaginary part of the interference relation.

5. The system of claim 1, further comprising at least one analog-to-digital converter (ADC) communicatively connected to the ICR.

6. The system of claim 5, wherein the at least one ADC includes at least a first ADC and a second ADC.

7. A system for laser phase noise compensation for a fibered optical path, the system being configured for connection with a node of the fibered optical path, the system comprising:
   a first signal splitter optically coupled to a laser source of the fibered optical path, the first signal splitter having:
      a first output optical path communicatively connected to an integrated coherent receiver (ICR) of the node, and
      a second output optical path;
   a second signal splitter optically coupled to the second output optical path, the second signal splitter having:
      a third output optical path, and
      a fourth output optical path,
      the third and fourth output optical paths having a path difference therebetween;
   a single polarization integrated coherent receiver (SP-ICR) optically coupled to the third output optical path and the fourth output optical path; and
   a digital signal processor (DSP) communicatively connected to the SP-ICR and the ICR,
   the SP-ICR being configured to determine, based on the path difference, at least one phase noise indication related to phase noise of the laser source,
   the DSP being configured to determine an estimated laser phase noise of the laser source based on at least the at least one phase noise indication.

8. The system of claim 7, wherein the DSP is further configured to compensate a detected reflected signal from the fibered optical path, based on the estimated laser phase noise.

9. The system of claim 7, wherein:
   the at least one phase noise indication includes a first indication and a second indication; and
   the DSP is configured to determine the estimated laser phase noise of the laser source based on both the first indication and the second indication.

10. The system of claim 9, wherein:
    the SP-ICR is further configured to determine an interference relation between signals received from the third output optical path and the fourth output optical path;
    the first indication is proportional to a real part of the interference relation; and
    the second indication is proportional to an imaginary part of the interference relation.

11. The system of claim 7, further comprising at least one analog-to-digital converter (ADC) communicatively connected to the SP-ICR.

12. The system of claim 11, wherein the at least one ADC includes a first ADC and a second ADC.

13. A method for compensating laser phase noise for a fibered optical path connected to a node, the method being performed by a system communicatively connected to the fibered optical path, the method comprising:

detecting, by an integrated coherent receiver (ICR), a first signal from a laser source of the node and a second signal from the laser source, the second signal having a delay from the first signal;

determining, by the ICR, based on the delay between the second signal and the first signal, at least one phase noise indication related to phase noise of the laser source; and determining, by a digital signal processor (DSP), an estimated laser phase noise of the laser source based on at least the at least one phase noise indication.

14. The method of claim 13, further comprising compensating, by the DSP, based on the estimated laser phase noise, a detected reflected signal from the fibered optical path.

15. The method of claim 13, wherein:
determining the at least one phase noise indication includes:
 determining a first indication, and
 determining a second indication; and
determining the estimated laser phase noise is based on both the first indication and the second indication.

16. The method of claim 15, wherein:
determining the first indication includes determining $I(t)$, where:

$$I(t) \propto Re\{A(t-\tau)A^*(t)\};$$

determining a second indication includes determining $Q(t)$, where:

$$Q(t) \propto Im\{A(t-\tau)A^*(t)\}; \text{ and}$$

determining the estimated laser phase noise includes determining $\Delta\varphi(k)$, where:

$$\Delta\hat{\varphi}_\tau(k) = \text{angle}(I(k)+jQ(k)),$$

with $A(x)$ being an electric field from the laser source, $\tau$ being the delay between the first signal and the second signal.

17. The method of claim 13, further comprising, prior to determining the estimated laser phase noise:

converting, by at least one analog-to-digital converter (ADC), an analog output of the first signal and the second signal from the ICR into a digital output of the first signal and the second signal.

* * * * *